United States Patent
Chou et al.

(10) Patent No.: US 7,606,440 B2
(45) Date of Patent: Oct. 20, 2009

(54) LINEAR IMAGE SENSING DEVICE WITH IMAGE MATCHING FUNCTION

(75) Inventors: Bruce C. S. Chou, Hsin Chu (TW); Yung-Pin Lee, Jhonghe (TW); Jer-Wei Chang, Hsin Chu (TW)

(73) Assignee: Egis Technology Inc., Hsinchu (TW)

( * ) Notice: Subject to any disclaimer, the term of this patent is extended or adjusted under 35 U.S.C. 154(b) by 699 days.

(21) Appl. No.: 11/376,179

(22) Filed: Mar. 16, 2006

(65) Prior Publication Data
US 2006/0210128 A1 Sep. 21, 2006

(30) Foreign Application Priority Data
Mar. 18, 2005 (TW) ................ 94108291 A (51) Int. Cl.
*G06K 9/36* (2006.01)
(52) U.S. Cl. .................. 382/284; 382/115; 382/124
(58) Field of Classification Search .......... 382/115, 382/116, 124
See application file for complete search history.

(56) References Cited

U.S. PATENT DOCUMENTS

| 5,940,526 | A  |   | 8/1999  | Setlak et al.           |
|-----------|----|---|---------|-------------------------|
| 6,289,114 | B1 |   | 9/2001  | Mainguet                |
| 6,317,508 | B1 |   | 11/2001 | Kramer et al.           |
| 6,459,804 | B2 | * | 10/2002 | Mainguet ........ 382/124|
| 6,546,122 | B1 | * | 4/2003  | Russo ........... 382/125|
| 6,628,377 | B1 | * | 9/2003  | Sabatini et al. ... 356/71|
| 6,643,389 | B1 | * | 11/2003 | Raynal et al. ..... 382/124|
| 6,650,314 | B2 | * | 11/2003 | Philipson ....... 345/157|
| 6,952,002 | B2 | * | 10/2005 | Hashimoto ...... 250/205|
| 7,194,115 | B2 |   | 3/2007  | Uchida                  |
| 7,200,250 | B2 | * | 4/2007  | Chou ............ 382/124|
| 2003/0021495 | A1 |   | 1/2003 | Cheng                  |

FOREIGN PATENT DOCUMENTS

| GB | 2 400 713 A     | 10/2004 |
|----|-----------------|---------|
| JP | 10-091769       | 4/1998  |
| JP | 2003-44856      | 2/2003  |
| JP | 2003-67751      | 3/2003  |
| JP | 2003-331269     | 11/2003 |
| JP | 2004-164170     | 6/2004  |
| JP | 2004-178134     | 6/2004  |
| JP | 2004-348726     | 12/2004 |
| JP | 2005-63020      | 3/2005  |
| KR | 2001-0012634 A  | 2/2001  |
| KR | 2003-0038679 A  | 5/2003  |
| WO | WO02/009034     | 9/2003  |

* cited by examiner

*Primary Examiner*—Yosef Kassa
(74) *Attorney, Agent, or Firm*—Muncy, Geissler, Olds & Lowe, PLLC (57) ABSTRACT

In a linear image sensing device with image matching function, a linear sensors array senses a finger, which is moving over it, to obtain fragment image analog signals, which are amplified, by a programmable gain amplifier, into amplified signals. An analog-to-digital converter sequentially converts the amplified signals into digital image signals. An image matching module sequentially receives and processes adjacent two of the digital image signals, and outputs continuous non-overlapped fragment images through an input/output interface. A control logic controls operations and communications of the above-mentioned components. A terminal system receives the non-overlapped fragment images and assembles the non-overlapped fragment images into a complete fingerprint image in a manner of stacking the images side by side.

7 Claims, 9 Drawing Sheets

DFS1

DFS2

OS1
DFS2
DFS1

RFS1

FIG. 6

DFS2

DFS3

OS2
DFS3
DFS2

RFS2
55    56

RFS3
57    58

LINEAR IMAGE SENSING DEVICE WITH IMAGE MATCHING FUNCTION

BACKGROUND OF THE INVENTION

1. Field of the Invention

The invention relates to a linear image sensing device with image matching function and a processing method thereof, and more particularly to a linear fingerprint sensing device, which contains a memory buffer and an image matching logic (or algorithm) and can continuously process input whole fragment images, temporarily store and output the continuous partial fragment images, and then assembles the continuous partial fragment images into a complete fingerprint image in a manner of stacking the partial fragment images side by side. The whole fragment image has the size equal to that of the sensor area, and the partial fragment image has the size smaller than that of the sensor area. The invention also correlates to the patent applications to one of the inventors: (a) U.S. patent application Ser. No. 10/403,052, filed on Apr. 1, 2003, entitled "CAPACITIVE FINGERPRINT SENSOR," and published on Oct. 9, 2003 as US20030190061A1; (b) Taiwan Patent Application No. 090112023, filed on May 17, 2001, and entitled "CAPACITIVE PRESSURE MICROSENSOR AND METHOD FOR MANUFACTURING THE SAME AND DETECTING SIGNALS OF THE SAME", now issued as Invention Patent No. 182652; (c) U.S. patent application Ser. No. 10/414,214, filed on Apr. 16, 2003, and entitled "THERMOELECTRIC SENSOR FOR FINGERPRINT THERMAL IMAGING"; (d) U.S. patent application Ser. No. 10/441,022, filed on May 20, 2003, and entitled "SWEEP-TYPE FINGERPRINT SENSOR MODULE AND A SENSING METHOD THEREFOR"; and (e) U.S. patent application Ser. No. 10/849,775, filed on May 21, 2004, and entitled "CARD DEVICE WITH A SWEEP-TYPE FINGERPRINT SENSOR".

2. Description of the Related Art

There are many known fingerprint authentication techniques. The use of an ink pad and the direct transfer of ink by the thumb or finger from the ink pad to a recording card is the standard way of making this identification. Then, an optical scanner scans the recording card to get an image, which is then compared to fingerprint images or templates in the computer database. However, the most serious drawback of the above-mentioned method is that the fingerprint identification cannot be processed in real-time, and thus cannot satisfy the requirement of real-time authentication, such as network authentication, e-business, portable electronics products, personal ID cards, security system, and the like.

The method for reading a fingerprint in real-time has become the important issue in the biometrics market. Conventionally, an optical fingerprint sensor may be used to read a fingerprint in real-time. However, the optical fingerprint sensor has some drawbacks like it is large in size and has high power consumption. Consequently, silicon fingerprint sensors, which overcome the drawbacks of the optical sensor and are formed by silicon semiconductor technology, are developed. For example, the capacitive fingerprint sensor with the product model number LCT-C500 available from LIGHTUNING TECH. INC. has the advantage.

Owing to the finger dimension, the sensing area of the conventional silicon fingerprint sensor is large, for example, it is greater than 9 mm*9 mm. Furthermore, owing to the limitations in manufacturing the silicon integrated circuit, only 50 to 70 good dies may be formed in a 6" wafer. The sensor is expensive to various applications. Thus, this expensive price may restrict the silicon fingerprint sensor in various consumer electronics applications such as notebook computers, mobile phones, personal digital assistants, computer peripheral products, or even personal ID cards embedded with the fingerprint sensor.

In order to overcome the cost problem, it is possible to reduce one-dimensional length of the conventional, two-dimensional (2D) area-type silicon fingerprint sensor to that of the linear sensor structure so as to increase the number of good dies and decrease the price of the sensing device. In this case, the finger sweeps across the sensor surface and the overall finger is sequentially scanned into a plurality of whole fragment images, which are then re-constructed into a complete image.

Figure 1:
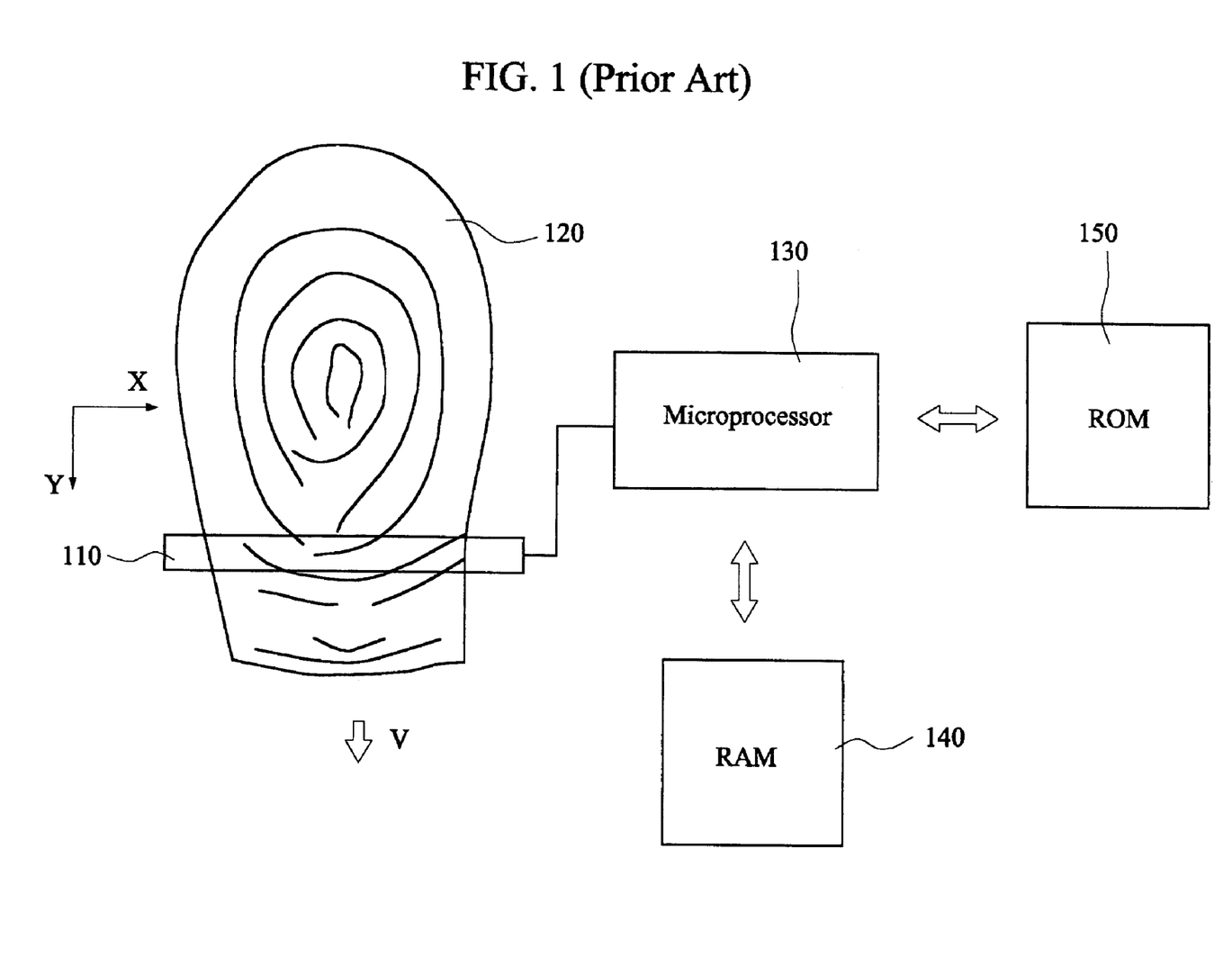
FIG. 1 is a schematic illustration showing the conventional architecture using a linear fingerprint sensor to read images of a fingerprint.
Figure 2A:
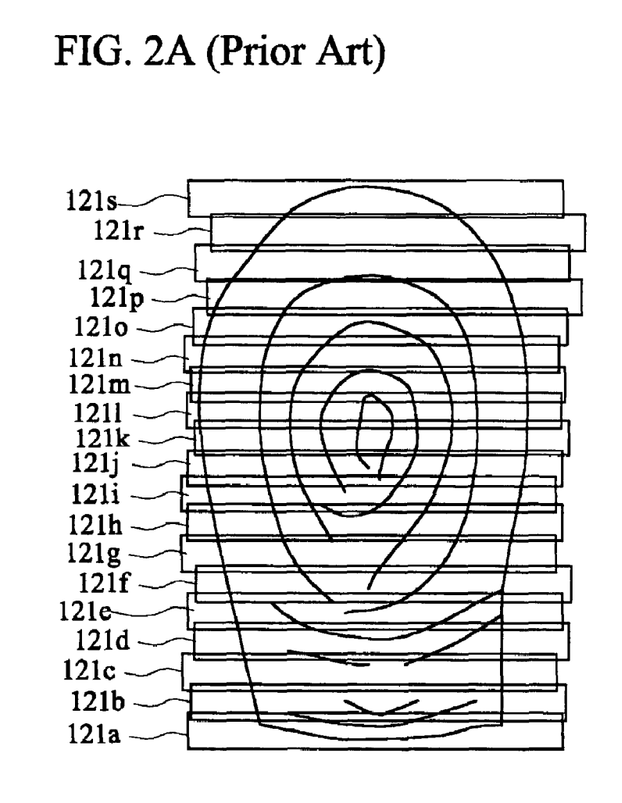
FIGS. 2A to 2D show an example of combining multiple fragment images into a complete fingerprint image.
Figure 2B:
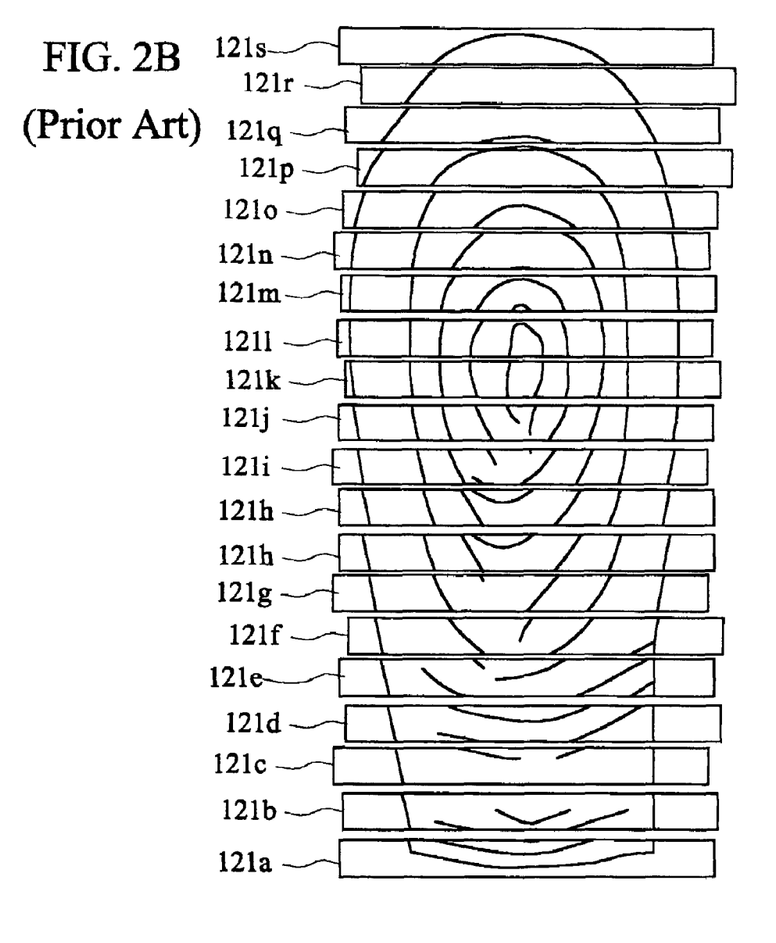
Figure 2C:
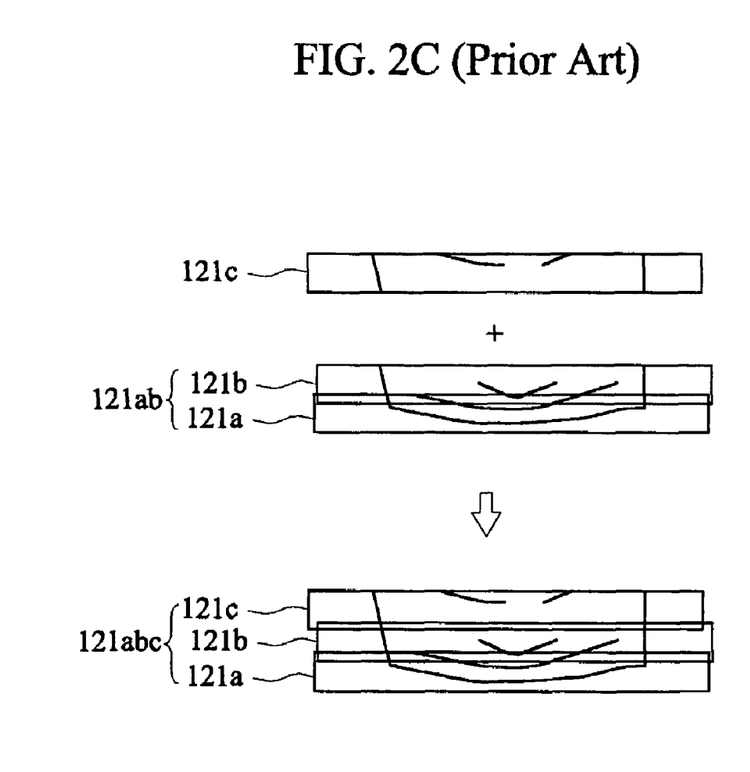
Figure 2D:
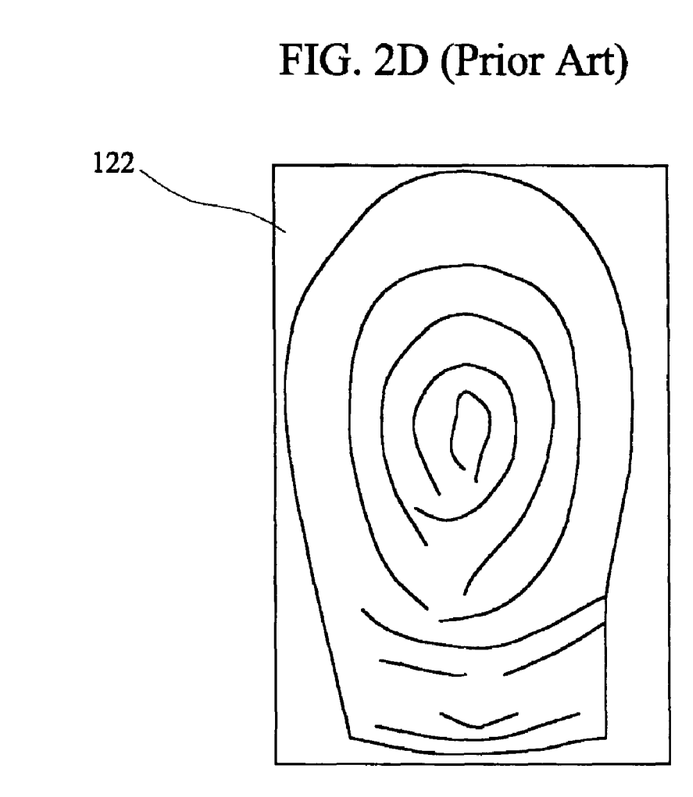

Mainguet et. al. and Kramer disclose linear fingerprint sensors and methods for reconstructing multiple overlapped whole images into a complete image in U.S. Pat. Nos. 6,289,114 and 6,317,508, as shown in FIGS. 1 and 2. FIG. 1 is a schematic illustration showing the conventional architecture using a linear fingerprint sensor to read images of a fingerprint. The sensor 110 is an array device having a horizontal dimension substantially equal to the width of the finger 120 and a vertical dimensional far smaller than the horizontal dimension, wherein the finger sweeps vertically. Thus, a relative moving speed V between the finger 120 and the sensor 110 is created. That is, the finger 120 sweeps over the surface of the sensor 110 at the speed V. Thus, the sensor 110 can continuously acquire whole fragment images, such as continuous whole fragment images 121$a$ to 121$s$ of FIG. 2A. The continuous whole fragment images 121$a$ to 121$s$ can be outputted to a microprocessor 130 with the data size as shown in FIG. 2B, and then stored in a random access memory (RAM) 140. Thereafter, the microprocessor 130 extracts the continuous fragment images 121$a$ to 121$s$ and reconstructs the fingerprint images according to the software logic stored in a read only memory (ROM) 150. First, the images 121$a$ and 121$b$ are reconstructed into an image 121$ab$, and then the images 121$c$ and 121$ab$ are reconstructed into an image 121$abc$, as shown in FIG. 2C. The processes are repeated analogically such that the fragment images 121$a$ to 121$s$ are reconstructed into a complete fingerprint image 122 corresponding to the fingerprint, as shown in FIG. 2D.

This method should acquire a relatively large fingerprint image without using a large-area sensor, and is thus advantageous to the cost reduction, and the enhancement of the recognition quality, such as the low false access rate and the low false rejection rate, which is similar to that obtained by the large-area fingerprint sensor.

However, the architecture and the method of the sensor 110 have some drawbacks. First, hundreds of fragment images have to be acquired within a very short period of time (smaller than 1 second). For example, if the sweeping speed of the finger is 10cm/sec and the specification of the fingerprint sensor is 8*280 (this is the specification of "Atmel Fingerchip", 500 dpi), the random access memory 140 must have the capacity larger than 600 Kbytes or a larger buffer memory is needed for the subsequent reconstructing process, and the cost of the system is thus increased. The '114 patent combines a first combined image, which is formed by combining a first fragment image with a second fragment image, with a third fingerprint image to form a second combined image. Then, the second combined image is combined with a fourth fingerprint image to form a third combined image. In this case, the memory occupied by the combined image gradually increases, and the buffer memory has to be large enough such that all fingerprint images can be combined.

Furthermore, in order to finish the fingerprint recognizing processes within one second (the typically allowable period is smaller than two seconds) after the finger sweeps over the chip surface, the communication interface between the chip of the sensor 110 and the microprocessor 130 of the terminal system must be an interface, such as a parallel interface having the DMA mode or the express serial interface of USB2.0, having a larger bandwidth. Thus, the typical I$^2$C or low-speed SPI or RS232 interface cannot be adopted for transmission, and the flexibility of the design is limited. The micro processor must be, for example, a DSP because the working speed of the micro processor must be very high.

Ericson discloses a fingerprint sensing device containing a memory buffer in U.S. Patent Publication No. 2003/0021495. The advantage of the '495 patent is that the image transmission of the microprocessor of the terminal system is more flexible. However, the problems in the capacity of the random access memory of the terminal system and in the transmission of the image data within a very short period of time (shorter than one second) through a broadband interface still cannot be solved. The micro processor must be, for example, a DSP because the working speed of the micro processor must be very high. In addition, the '495 patent does not mention how to solve the problem in the subsequent image processing method.

SUMMARY OF THE INVENTION

It is therefore an object of the invention to provide a linear image sensing device with image matching function and a processing method thereof, wherein the image sensing device outputs a plurality of non-overlapped partial fragment images so as to greatly reduce the data size outputted by the image sensing device, the data transmission bandwidth between the chip and the terminal system, and thus the memory capacity for the image sensing device and the terminal system CPU speed.

The invention achieves the above-identified object by providing an image sensing device to be electrically connected to a terminal system. The image sensing device includes a linear sensors array, a programmable gain amplifier, an analog-to-digital converter, an image matching module, an input/output interface and a control logic. The linear sensors array senses a plurality of overlapped whole fragment images of an object when the object moves over the linear sensors array substantially along a moving direction, and thus outputs a plurality of whole fragment image analog signals. The programmable gain amplifier amplifies the whole fragment image analog signals and then outputs a plurality of amplified signals. The analog-to-digital converter sequentially receives and converts the amplified signals into a plurality of digital image signals. The image matching module receives and matches the digital image signals, and sequentially regenerates non-overlapped partial fragment images, which do not overlap with one another. The input/output interface, which is electrically connected to the terminal system in a wired (direct) or wireless (indirect) manner, sequentially outputs the non-overlapped partial fragment images to the terminal system. The control logic controls operations of the linear sensors array, the programmable gain amplifier, the analog-to-digital converter, the image matching module and the input/output interface.

The invention also achieves the above-identified object by providing a processing method for an image sensing device. The method includes the steps of: using a linear sensors array to sense a plurality of overlapped whole fragment images of an object as the object moves substantially along a moving direction and to obtain a plurality of fragment image analog signals; amplifying the fragment image analog signals and outputting a plurality of amplified signals; sequentially converting the amplified signals into a plurality of digital image signals; and matching the digital image signals and sequentially regenerating non-overlapped partial fragment images, which do not overlap with one another.

DETAILED DESCRIPTION OF THE INVENTION

Figure 3:
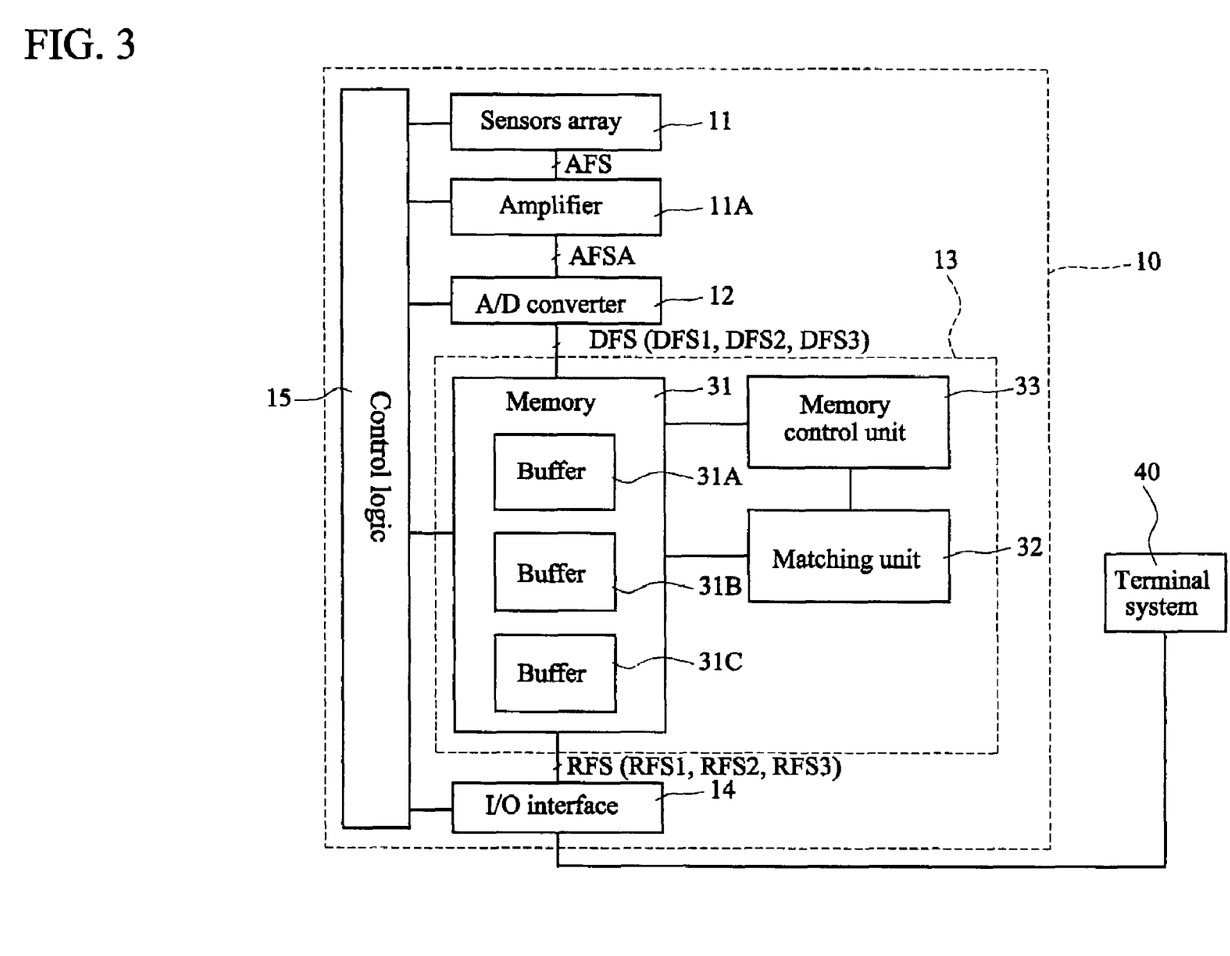
FIG. 3 is a block diagram showing a linear image sensing device with image matching function according to a first embodiment of the invention.
Figure 4:
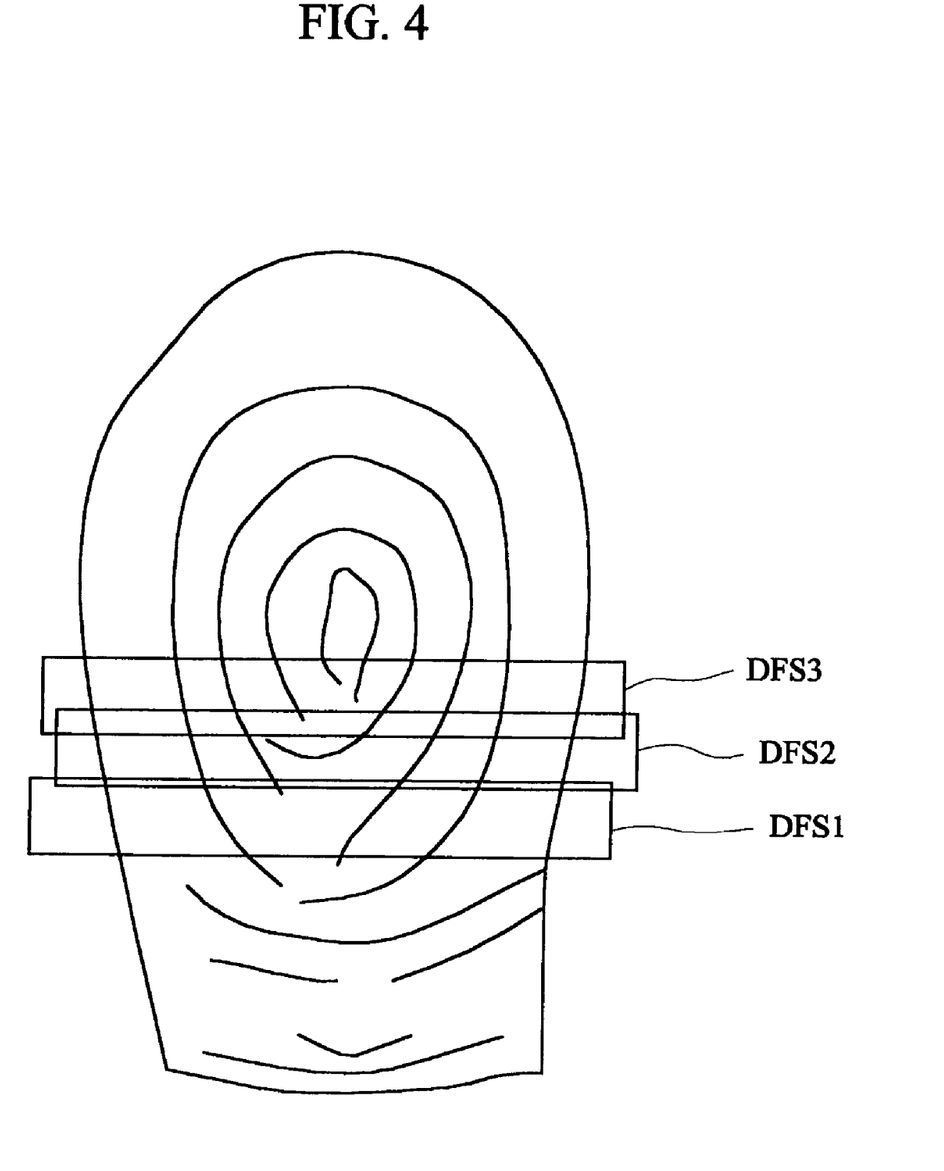
FIG. 4 is a schematic illustration showing images acquired using the image sensing device of the invention.
Figure 5:
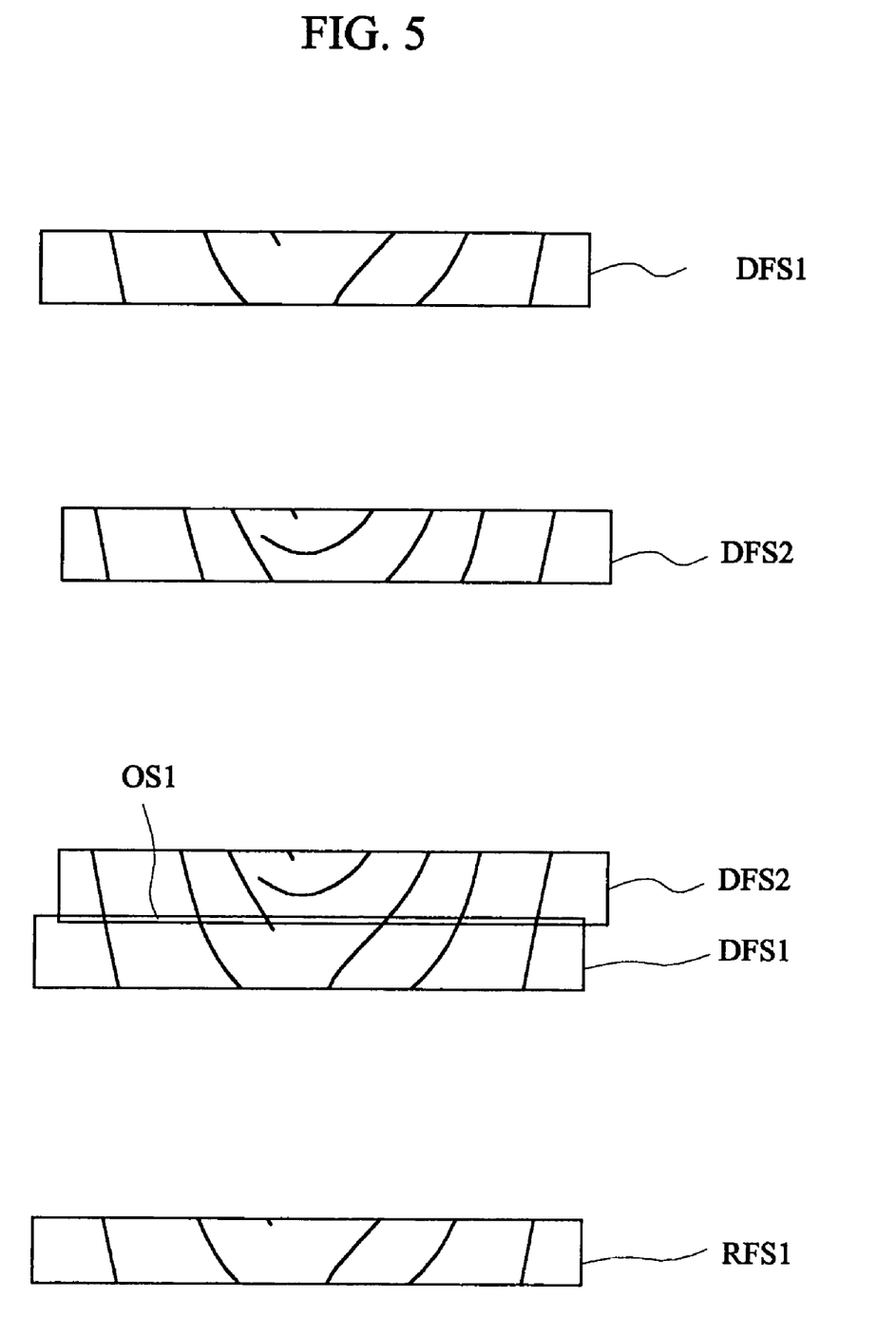
FIG. 5 is a schematic illustration showing the image matching between the first fragment image signal and the second fragment image signal of FIG. 4.
Figure 6:
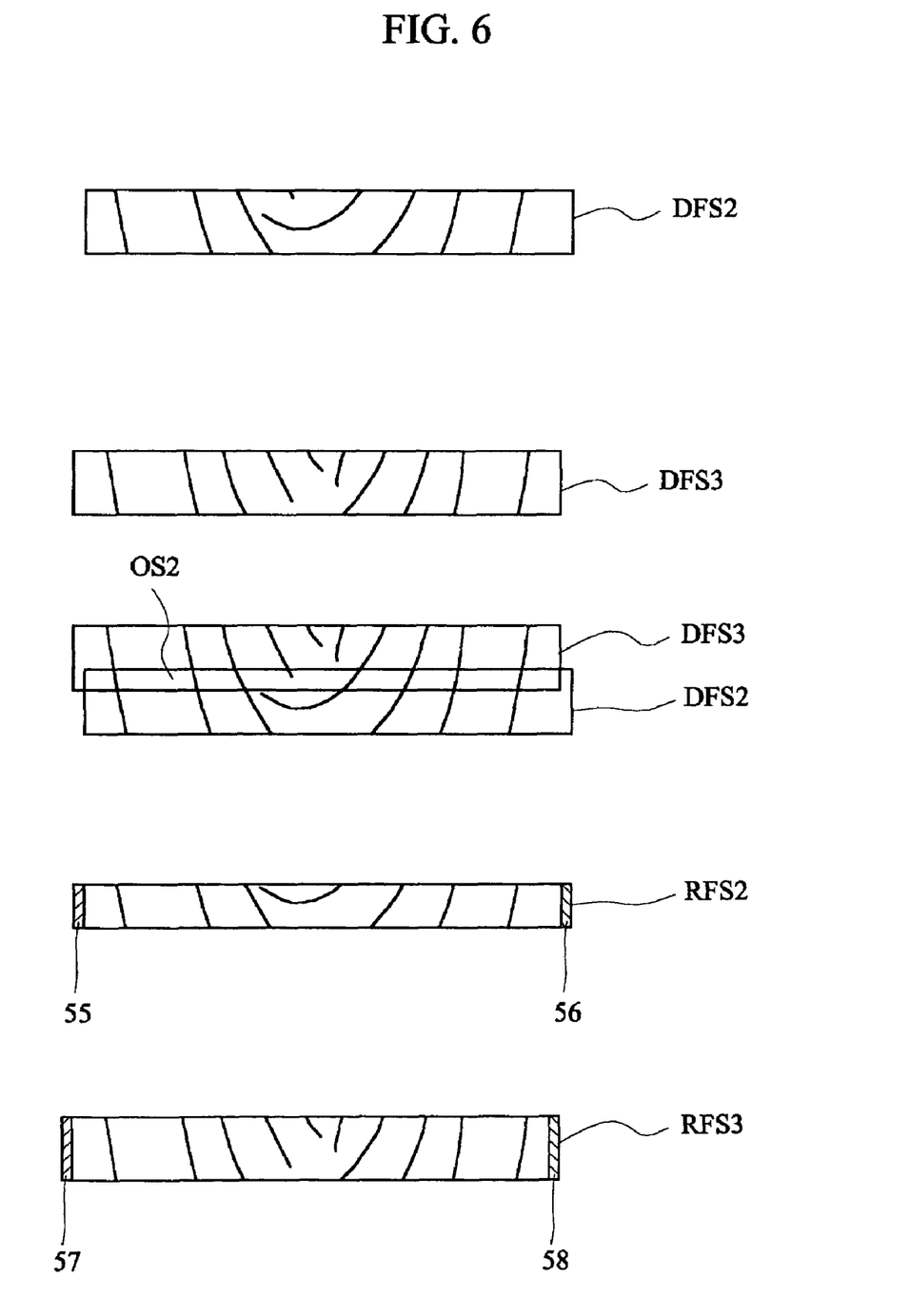
FIG. 6 is a schematic illustration showing the image matching between the second fragment image signal and the third fragment image signal of FIG. 4.

FIG. 3 is a block diagram showing a linear image sensing device with image matching function according to a first embodiment of the invention. FIG. 4 is a schematic illustration showing images acquired using the image sensing device of the invention. FIG. 5 is a schematic illustration showing the image matching between the first fragment image signal and the second fragment image signal of FIG. 4. FIG. 6 is a schematic illustration showing the image matching between the second fragment image signal and the third fragment image signal of FIG. 4.

As shown in FIGS. 3 to 6, the linear image sensing device 10 of this embodiment is to be electrically connected to a terminal system 40, such as a computer, a mobile phone, a personal digital assistant, or the like. The linear image sensing device 10 includes a linear sensors array 11, a programmable gain amplifier 11A, an analog-to-digital (A/D) converter 12, an image matching module 13, an input/output (I/O) interface 14 and a control logic 15.

The linear sensors array 11 is disposed on a substrate. In this embodiment, the substrate is made of semiconductor like silicon material. In another embodiment, this substrate may be made of insulator material like glass, polymer or other known materials. The sensor may be a capacitive sensor, a pressure sensor, a temperature sensor, an optical sensor, an electric-field sensor, or a magnetic field sensor, as disclosed in the above-mentioned (a) to (c) patent applications and other type of sensors.

In this embodiment, the sensor is a capacitive sensor, and the sensors array has the specification of 168*8 sensing member pixels. Each sensing member pixel includes a sensing electrode and a sensing circuit in the substrate under the sensing member pixel. Each pixel has the dimension of 50*50 microns and the resolution of 508 DPI.

The linear image sensing device 10 senses a plurality of overlapped whole fragment images of a finger (an object) as the finger moves over the linear sensors array 11 substantially along a moving direction, and then obtains a plurality of whole fragment image analog signals AFS. The programmable gain amplifier 11A properly amplifies the whole fragment image analog signals AFS and then outputs amplified signals AFSA. The analog-to-digital converter 12 sequentially receives and converts the amplified signals AFSA into a plurality of digital image signals DFS. For the sake of simplicity, the digital image signals DFS sequentially include a first whole fragment image signal DFS1, a second whole fragment image signal DFS2 and a third whole fragment image signal DFS3, as shown in FIG. 4. The image matching module 13 receives and matches the digital image signals DFS and sequentially regenerates a plurality of non-overlapped partial fragment images RFS. The fragment image RFS sequentially includes a first partial fragment image RFS1, a second partial fragment image RFS2 and a third partial fragment image RFS3. The images RFS1 to RFS3 usually have different lengths, but may have the same length in special conditions when the finger speed is always constant. The input/output interface 14 electrically connected to the terminal system 40 sequentially outputs the non-overlapped fragment images RFS to the terminal system 40. Because the plurality of non-overlapped fragment images RFS do not overlap with one another, the number of pixels of each fragment image RFS in the moving direction is smaller than or equal to the number of sensing units of the linear sensors array 11 in the moving direction. In this invention, the whole fragment image has the size equal to that of the sensor area, and the partial fragment image has the size smaller than that of the sensor area.

If the third fragment image RFS3 is the last output signal, the data size of either of the first fragment image RFS1 or the second fragment image RFS2 is smaller than or equal to the data size of the third fragment image RFS3 because the non-overlapped fragment images RFS do not overlap with one another.

The control logic 15 controls operations of the linear sensors array 11, the programmable gain amplifier 11A, the analog-to-digital converter 12, the image matching module 13 and the input/output interface 14. The image matching module 13 receives and matches the first fragment image signal DFS1 and the second fragment image signal DFS2 and then outputs the matching result. At this time, the first fragment image RFS1 is the non-overlapped image obtained by subtracting the overlapped portion between the second fragment image signal DFS2 and the first fragment image signal DFS1 from the first fragment image signal DFS1. In order to reduce the chip area, the cost and the power consumption of the chip device of the invention, the operation logic (or algorithm) used in the image matching module, which is an integrated circuit, in the invention has to be very simple and does not need a microprocessor or the architecture of floating point calculation in, for example, a DSP. Instead, a typical digital logic circuit can handle the process such that the area is small, the speed is high, and the power may be saved. The image matching logic used in the embodiment is to match the intensity distributions of neighboring two fragment images based on least-square method. It is also possible to determine the overlapped region of neighboring two fragment images by judging the time period for acquiring the fragment images.

In order to achieve the image matching function, the image matching module 13 includes a memory 31, an image matching unit 32 and a memory control unit 33. The memory 31 can temporarily store adjacent two of the digital image signals DFS (e.g., the first fragment image signal DFS1 and the second fragment image signal DFS2 in FIG. 5, or the second fragment image signal DFS2 and the third fragment image signal DFS3 in FIG. 6) at a time. The image matching unit 32 matches adjacent two of the digital image signals DFS stored in the memory 31 and then regenerates the non-overlapped fragment images RFS according to the above-mentioned mathematical logic. The memory control unit 33 controls operations of the memory 31 and the image matching unit 32.

The image sensing device of the invention can provide the processing method including the following steps.

First, a plurality of overlapped fragment images of an object (e.g., a finger) is sensed, as the finger moves, to obtain a plurality of fragment image analog signals AFS. Then, the fragment image analog signals AFS are properly amplified and then amplified signals AFSA are outputted. Next, the amplified signals AFSA are sequentially converted into a plurality of digital image signals DFS, which sequentially includes a first fragment image signal DFS1, a second fragment image signal DFS2 and a third fragment image signal DFS3. Then, any adjacent two of the digital image signals DFS are matched to regenerate a plurality of non-overlapped fragment images RFS, which sequentially includes a first fragment image RFS1, a second fragment image RFS2 and a third fragment image RFS3. Each of these continuous non-overlapped fragment images RFS may be managed by the memory control unit 33 and temporarily stored in the buffer 31C. Then, the control logic 15 controls the non-overlapped fragment images RES to output to the terminal system 40 through the I/O interface 14, and then the non-overlapped fragment images are assembled into a complete fingerprint image in a manner of stacking the images side by side.

The method of matching the digital image signals DFS will be described in the following. First, the buffers 31A and 31B of the memory 31 respectively receive and store the first fragment image signal DFS1 and the second fragment image signal DFS2, as shown in FIGS. 5 and 3. Then, the image matching unit 32 matches the first fragment image signal DFS1 with the second fragment image signal DFS2 to obtain a first overlapped signal OS1. Next, the first overlapped signal OS1 is subtracted from the first fragment image signal DFS1, and the first fragment image RFS1 is thus obtained and outputted. Thus, the first fragment image RFS1 is obtained by subtracting the overlapped signal OS1 between the first fragment image signal DFS1 and the second fragment image signal DFS2 from the first fragment image signal DFS1. Then, the control logic 15 outputs the first fragment image RFS1 to the memory buffer 31C and then the terminal system 40 through the I/O interface 14.

Thereafter, as shown in FIGS. 6 and 3, the first fragment image signal DFS1 stored in the memory buffer 31A is cleared. Then, the empty buffer (e.g., 31A) of the memory 31 receives and stores the third fragment image signal DFS3. Next, the second fragment image signal DFS2 and the third fragment image signal DFS3 are matched to obtain a second overlapped signal OS2. Then, the second fragment image RFS2 is obtained and outputted by subtracting the second overlapped signal OS2 from the second fragment image signal DFS2. Finally, points are added to or removed from the third fragment image signal DFS3 to generate and output the third fragment image RFS3. It is to be noted that the invention is not limited to the example of three fragment image signals and three fragment images. Instead, the invention is also suitable for the application having two or more than three fragment image signals and fragment images. Because the associated processing steps are similar to each other, the descriptions thereof will be omitted.

During the matching procedure, it is obtained that the third fragment image signal DFS3 is shifted rightward relative to the first fragment image signal DFS1 according to the summation of the signals DFS1 and DFS2 and the signals DFS2 and DFS3. Thus, the second fragment image RFS2 contains the left block 55 but does not contain the right block 56, and the third fragment image RFS3 contains the left block 57 but does not contain the right block 58.

In order to manage and reduce the capacity of the memory 31 effectively, the speeds of the series of operations including the memory writing speed, the processing speed of the image matching unit and the speed of outputting the non-overlapped fragment images have to be much higher than the moving speed of the finger, and the period for the series of operations has to be shorter than 1 millisecond.

Thus, the memory 31 only has to store two fragment signals, and the minimum capacity of the memory 31 is substantially equal to the double of the data size of each digital image signal DFS.

Heretofore, the chip device of the invention can continuously output the non-overlapped fragment images according to the image matching unit and the memory control method. When the finger is placed on the chip device and moves, the movement information in the X and Y axes can be provided by judging the outputting formats of the continuous non-overlapped fragment images, such as the change of length and the rate of change of length, or the change of width and the rate of change of width of the blocks 57 and 58, which is similar to the finger moving in a digital panel.

Figure 7:
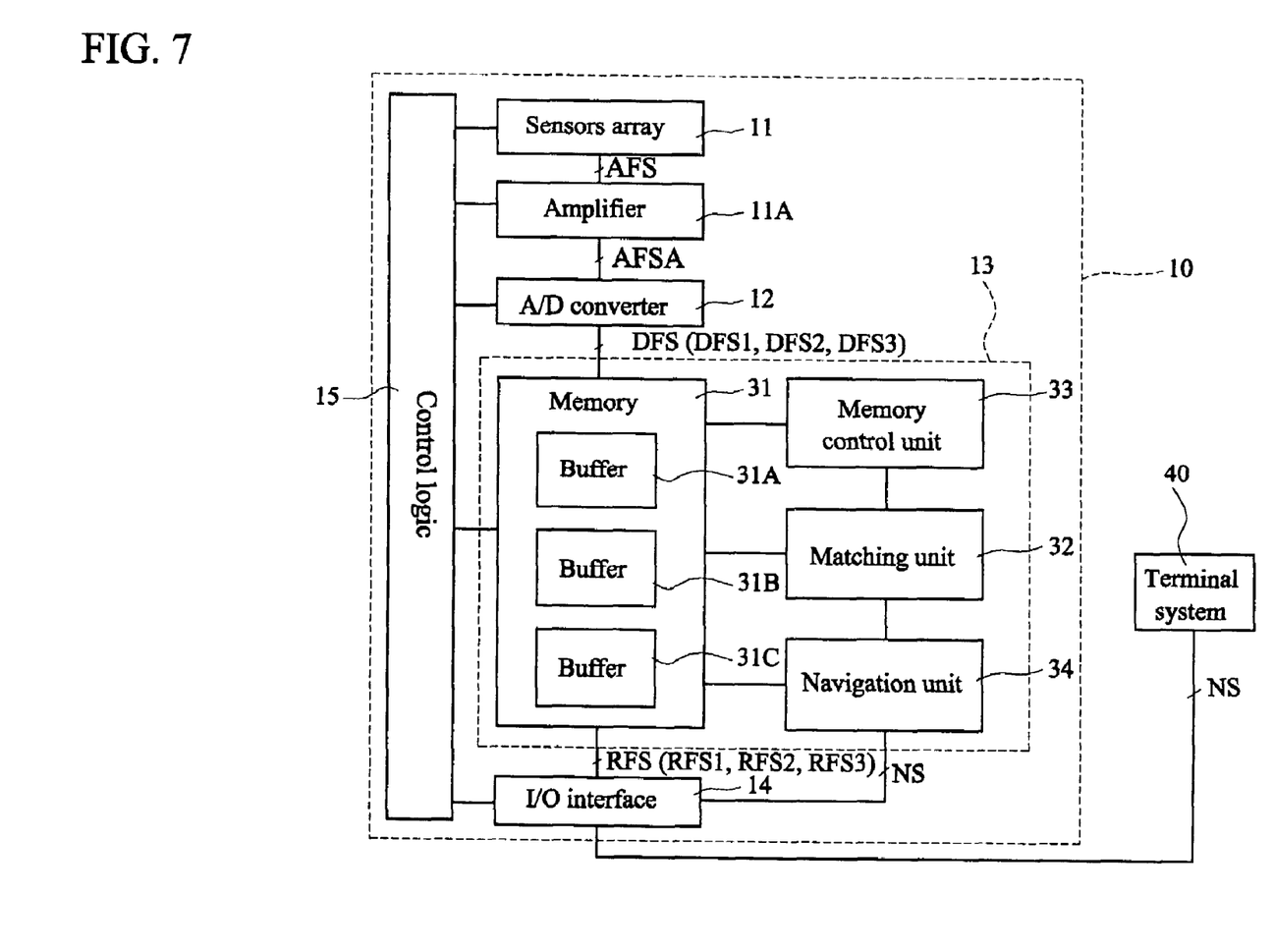
FIG. 7 is a block diagram showing a linear image sensing device with image matching function according to a second embodiment of the invention.

FIG. 7 is a block diagram showing a linear image sensing device with image matching function according to a second embodiment of the invention. As shown in FIG. 7, this embodiment is similar to the first embodiment except that the image matching module 13 further includes a navigation unit 34 controlled by the control logic 15. The navigation unit 34 calculates a relative movement relationship between adjacent two of the digital image signals DFS according to the non-overlapped fragment images RFS and the digital image signals DFS so as to output a navigation signal NS through the input/output interface 14 to control operations of a pointer system (e.g., mouse cursor system) in the terminal system 40.

It is to be noted that the linear image sensing device of this embodiment may only provide the function of outputting the navigation signal NS without outputting the fragment image.

Figure 8:
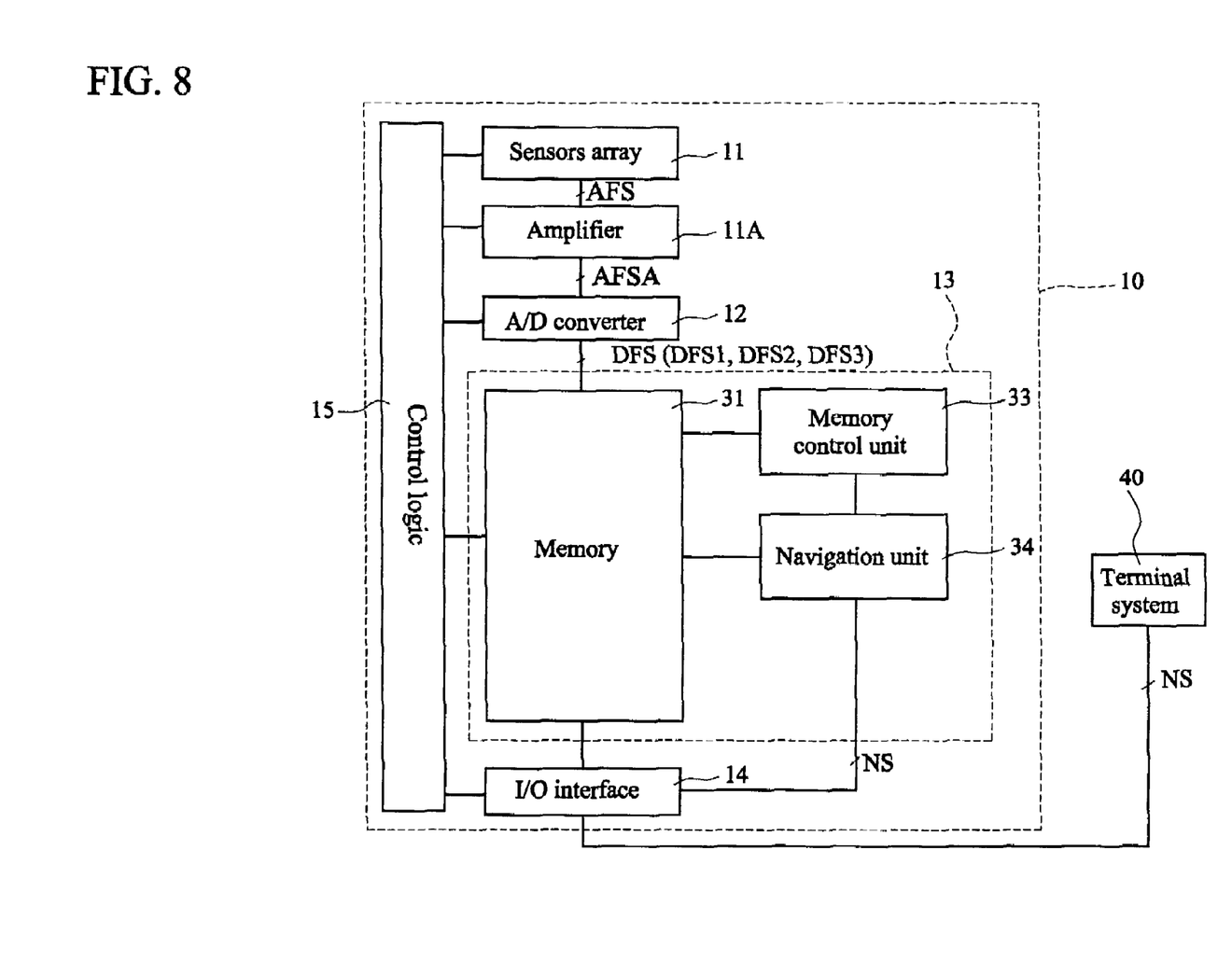
FIG. 8 is a block diagram showing a linear image sensing device with image matching function according to a third embodiment of the invention.

FIG. 8 is a block diagram showing a linear image sensing device with image matching function according to a third embodiment of the invention. As shown in FIG. 8, the third embodiment is similar to the second embodiment except that the third embodiment does not output the non-overlapped fragment images. Thus, the linear sensors array 11 senses a plurality of overlapped fragment images of a finger as the finger moves over the array in an arbitrary direction and thus obtains a plurality of fragment image analog signals AFS. The programmable gain amplifier 11A and the analog-to-digital converter 12 have the same functions as those of the second embodiment, and detailed descriptions thereof will be omitted. The image matching module 13 receives and matches the digital image signals DFS to calculate a relative movement relationship between adjacent two of the digital image signals DFS, so as to output a navigation signal NS through the input/output interface 14 to control the operations of the pointer system in the terminal system 40.

The image matching module 13 includes a memory 31, a navigation unit 34 and a memory control unit 33. The memory 31 temporarily stores adjacent two of the digital image signals at a time. The navigation unit 34 matches the adjacent two of the digital image signals DFS stored in the memory 31 and generates the navigation signal NS. The memory control unit 33 controls operations of the memory 31 and the navigation unit 34

The processing method for the linear image sensing device according to the third embodiment includes the following steps. First, the linear sensors array 11 senses a plurality of overlapped fragment images of a finger as the finger moves over the array in an arbitrary direction, and thus obtains a plurality of fragment image analog signals AFS. Then, the fragment image analog signals AFS are amplified and a plurality of amplified signals AFSA is outputted. Next, the amplified signals AFSA are sequentially converted into a plurality of digital image signals DFS. Then, the digital image signals DFS are compared and matched such that a relative movement relationship between adjacent two of the digital image signals DFS is calculated. Thus, a navigation signal NS is outputted to control operations of the pointer system in the terminal system 40.

According to the embodiment of the invention, the linear image sensing device performs the matching procedure by way of simple logic calculation without using complicated processing circuits. Thus, the effects of power-saving and miniaturizing the product can be achieved. In addition, because the minimum capacity of the memory may be equal to the double of the data size of each digital image signal, the cost and the consumption power of the sensing device can be reduced. In addition, because the data size in each transmission is not greater than the data size of one digital image signal and no overlap occurs, the bandwidth between the sensing device of the invention and the terminal system may be lowered, and the memory space in the terminal system may be greatly reduced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. An image sensing device to be electrically connected to a terminal system, the image sensing device comprising:

a linear sensors array for sensing a plurality of overlapped whole fragment images of an object when the object moves over the linear sensors array substantially along a moving direction, and thus outputting a plurality of fragment image analog signals;

a programmable gain amplifier for amplifying the fragment image analog signals and then outputting a plurality of amplified signals;

an analog-to-digital converter for sequentially receiving and converting the amplified signals into a plurality of digital image signals;

an image matching module for receiving and matching the digital image signals, and sequentially regenerating non-overlapped partial fragment images, which do not overlap with one another;

an input/output interface, which is electrically directly or indirectly connected to the terminal system, for sequentially outputting the non-overlapped partial fragment images to the terminal system such that the non-overlapped fragment images are assembled into a complete fingerprint image in a manner of stacking the non-overlapped fragment images side by side; and a control logic, electrically connected to the linear sensors array, the programmable gain amplifier, the analog-to-digital converter, the image matching module and the input/output interface, for controlling operations of the linear sensors array, the programmable gain amplifier, the analog-to-digital converter, the image matching module and the input/output interface.

2. The chip according to claim 1, wherein the number of pixels of each of the non-overlapped partial fragment images in the moving direction is smaller than or equal to the number of sensing units of the linear sensors array in the moving direction.

3. The chip according to claim 1, wherein the non-overlapped partial fragment images sequentially comprise a first fragment image, a second fragment image and a third fragment image, and any of the first fragment image and the second fragment image has a data size smaller than or equal to a data size of the third fragment image.

4. The chip according to claim 1, wherein the image matching module comprises:
   a memory for temporarily storing adjacent two of the digital image signals;
   an image matching unit for matching the adjacent two of the digital image signals stored in the memory, and thus regenerating the non-overlapped partial fragment images; and
   a memory control unit for controlling operations of the memory and the image matching unit 5. The chip according to claim 4, wherein a capacity of the memory is substantially equal to a double of a data size of each of the digital image signals.

6. The chip according to claim 4, wherein the image matching module further comprises a navigation unit for a calculating relative movement relationship between the adjacent two of the digital image signals according to the non-overlapped partial fragment images and the digital image signals, and thus outputting a navigation signal through the input/output interface to control operations of a pointer system of the terminal system.

7. The chip according to claim 1, wherein the digital image signals sequentially comprise a first fragment image signal and a second fragment image signal, the non- overlapped partial fragment images comprise a first fragment image, which corresponds to an overlapped signal obtained by subtracting one of the first fragment image signal and the second fragment image signal from the first fragment image signal.

* * * * *